Nov. 16, 1954     H. WINET ET AL     2,694,525
GAS BAKING OVEN TEMPERATURE REGULATOR
Original Filed Sept. 21, 1950
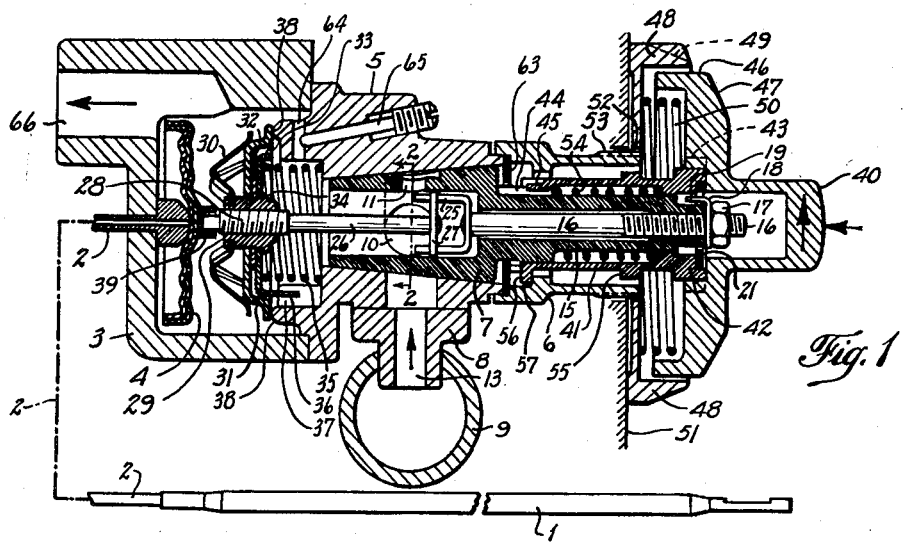
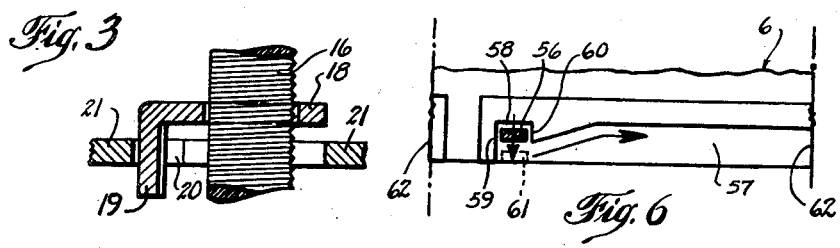
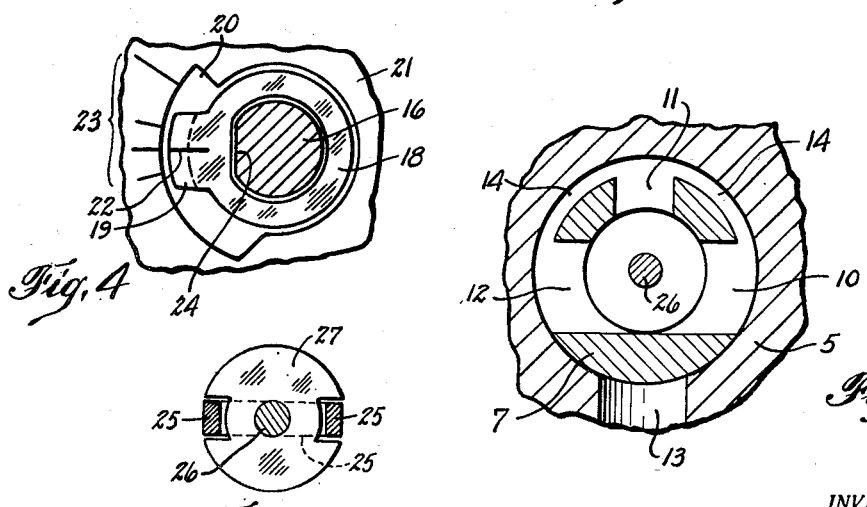
INVENTORS
HANS WINET
ALBERT KASER
BY Morgan, Finnegan & Durham
ATTORNEYS.

United States Patent Office

2,694,525
Patented Nov. 16, 1954

2,694,525

GAS BAKING OVEN TEMPERATURE REGULATOR

Hans Winet, Zurich, and Albert Käser, Schonegg, Zug, Switzerland, assignors to Landis & Gyr, A. G., Zug, Switzerland, a body corporate of Switzerland Continuation of application Serial No. 185,918, September 21, 1950. This application April 28, 1951, Serial No. 223,493

Claims priority, application Switzerland September 22, 1949

13 Claims. (Cl. 236—99)

The present invention relates to a gas baking oven temperature regulator in which the main valve for the gas supply and the adjusting arrangement of a regulating valve, influenced by a liquid expansion temperature feeler, are simultaneously actuated by hand as a function of the desired temperature.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a longitudinal section of a typical and illustrative gas baking stove temperature regulator in accordance with the present invention;

Figure 2 is a cross section taken on the line 2—2 of Figure 1;

Figure 3 is a fragmentary detail of a calibration arrangement;

Figure 4 is a fragmentary cross section of the parts shown in Figure 3;

Figure 5 is a sectional detail of a driver connection between the dial and the disc valve adjusting means; and Figure 6 is a developed view showing the locking means for the dial.

The present invention provides a novel and improved gas oven regulating thermostat of simplified and improved construction which is entirely reliable in its operation, may be easily installed and may be readily adjusted for its initial calibration. A further object is the provision of an improved thermostat in which a temperature responsive liquid acts on a metallic bellows which in turn acts directly on the valve disc, the valve disc being adjustably mounted on a spindle for axial movement with respect to said spindle and which may be adjusted by the manually controlled dial.

In accordance with the illustrative and preferred embodiment of the invention as shown in the accompanying drawings, the temperature responsive element comprises a hollow metallic bulb 1, to be positioned in an oven, and filled with an expansion liquid which is conductively connected by way of a capillary tube 2 with a metallic bellows 4 arranged in a valve chamber 3. At the right of the valve chamber 3 there is connected a main valve housing 5 and to the latter a guide sleeve 6. The valve chamber 3 and main valve housing 5 may be connected by any suitable means, for example by means of screws in the front and rear which would not be visible in Fig. 1. The same may be said for the connection between the main valve housing 5 and the guide sleeve 6. The interior of the plug housing 5 is machined in the shape of a cone and serves as the seat of a plug 7. In the lower portion of the plug housing 5 there is arranged a gas intake connection 8 connected to a gas supply pipe 9. The interior of the plug 7 is hollow and is provided with a rear plug bore 10, an upper plug bore 11 and, in front, in the cut-off section, another plug bore 12, which latter is made similar to the rear one and is arranged symmetrically with the rear bore with respect to the plane of the drawing.

Figure 2 shows a cross section 2—2 of the plug 7 at the level of the plug housing intake bore 13, the previously mentioned parts being provided with the same reference figures. As shown, the three plug bores 10, 11, 12 are connected by means of a conducting groove 14 on the outer circumference of the plug. This serves the purpose of allowing the quantity of gas supplied to increase rapidly when the plug is rotated and of holding it thereupon approximately constant at a certain value. As likewise shown by Figure 1, the plug 7 is provided at the right with a neck-shaped extension 15 which is hollow, like the plug itself, and is provided at its right end with a female thread into which a calibrating spindle 16 is screwed. The latter is held in position by means of a lock nut 17. For the purpose of indicating the position of the calibrating spindle 16 there is arranged between the right end of the plug neck 15 and the safety nut 17 a guard indicator 18 with a projection 19 pointing below to the left, which projects into a recess 20 of a stop plate 21.

Figure 3 shows the indicator arrangement on a magnified scale, and Figure 4 shows view in plan of Figure 3 with the calibrating spindle in section.

Figure 4 shows clearly the recess 20 in the stop plate. Furthermore this figure shows also the mark 22 on the guard indicator and the several calibrating marks 23 on the stop plate 21. Of course the guard indicator must be arranged so as not to rotate with respect to the calibrating spindle 16, which may be accomplished by flattening the free end of the calibrating spindle 24 and shaping the opening in the guard indicator in a corresponding manner. In this way, when the spindle 16 is rotated, the guard indicator 18 rotates with it. By loosening the lock nut the mark 22 of the guard indicator can now be set opposite the calibrating marks 23 and then be locked again. This causes the calibrating spindle 16 to maintain a very definite position in relation to the plug 7.

The function of the spindle 16 being threaded at the right end is threefold. First of all, the threaded engagement of the spindle 16 with the neck extension 15 provides a seal which prevents the escape of gas. Secondly, the position of the spindle 16 in relation to that of the plug 7 may be fixed by means of the lock nut 17 engaging the spindle 16. Thirdly, the guard indicator 18 located between the right end of the plug neck 15 and lock nut 17 is fixed to the spindle by means of the lock nut 17 screwed on said spindle.

The left end of the calibrating spindle is provided with a fork 25, the prongs of which project into recesses of a driven disc 27 rigidly arranged on a working spindle 26. Figure 5 offers a view of the driver disc 27 in the direction of the axis of the calibrating spindle, which shows one embodiment of said disc. Only little play is provided for between the recesses of the driver disc 27 and the two fork prongs 25, so that any rotation of the calibrating spindle 16 is transferred at the true angle to the working spindle. However, on the other hand the calibrating spindle and the working spindle can be displaced in relation to each other within a definite range.

The left end of the working spindle 26 is provided with an adjusting thread 28 onto which a spindle nut 29 is screwed. On said spindle nut an overload spring 30, designed for example as a multiple-arm leaf spring, is rigidly arranged, which presses with its arms a valve disc 31 against a stop ring 32 of the spindle nut 29. On the other side of said stop ring rests a dish-shaped disc 33 which is rigidly connected by means of a pressed joint 34 to the spindle nut 29. Against the dish-shaped disc there presses a counter-spring 35 which bears with its other end against the plug housing 5. On its lower side the dish-shaped disc has a projection 36 which projects into a groove 37 of the plug housing in such a manner that the spindle nut 29 is prevented from turning. Since the spindle nut cannot turn, it will move in an axial direction when the working spindle 26 is rotated. Now the proportions are so selected that on a rotation of the working spindle 26 in the clockwise direction, seen from right to left in the direction of the working spindle, the valve disc 31 is lifted from its valve seat 38 of the plug housing 5 and opens the gas passage, i. e. the setting thread 28 is a left thread. In other words, when the spindle nut 29 moves to the left in an axial direction, the valve disc 31 positioned on the spindle nut also moves to the left so that a passage is left between the valve seat 38 and valve disc 31. Gas coming in from the supply will first go through the ports 10, 11 and 12 in plug 7 and then through the passage created by the movement of said valve disc to the left and then to the gas outlet. The valve disc 31, overload spring 30, stop ring 32 and spindle nut 29 form a self contained unit, with the result that the overload spring 30 cannot be influenced by the valve counter spring 35 relative to compression forces. The projection 36 which prevents the spindle nut 29 from turning is on the outer periphery of the counter spring 35 which eliminates possibility of play. The left thread of the setting thread 28 projects into a cup 39 which serves as the left guide of the working spindle 26 and is rigidly connected to the right membrane of the metallic bellows 4, the right guide of the working spindle 26 being formed by the driver disc 27. As the valve spindle is directly connected on the left side to the bellows 4 and on the right side to the driver disc 27 and fork prongs of the calibrating spindle 16, the system consists of direct connections with little chance of lag and friction and hence the system will be a sensitive one.

The left wall of the metallic bellows 4 is connected to the end of the capillary tube 2 and is provided at its center with an opening enabling the expansion liquid of the temperature feeler to enter the hollow space between the two membranes. The free edges of the membranes are bent at a right angle and welded gas-tight at their edge. At room temperaure, i. e. as long as the expansion liquid in the temperature feeler 1 has not expanded the two membranes are adjacent each other.

The arrangement described is actuated by means of an adjusting knob or dial 40 which is rigidly connected in front and behind to a setting sleeve 41 by means of two screws not visible in Figure 1. The right end of the setting sleeve 41 projects with a flange 42 into the setting knob which flange possesses both above and below a beveling 43. Thus the setting knob 40 can be put on in two positions 180° apart with respect to the setting sleeve 41. Rotation of the setting knob 40 is imparted to the plug 7 by means of a lug 45 of the setting sleeve 41 projecting into a groove 44 in the plug neck 15. The temperature set by means of the setting knob 40 can be read on an index or scale arranged on the cylindrical part 46 of the setting knob 40, the lettering of which is on the conical part 47, opposite a calibrating mark 49 found on a collar disc 48. The collar disc 48 is thrust by means of a compression spring 50, which on the other side bears against the interior of the setting knob 40, against the stove cover 51. Its displacement is prevented by two grooves 52 into which project two ribs 53 of the guide sleeve 6. The collar disc 48 can likewise be mounted in two positions 180° apart. The movable arrangement of the collar disc 48 has the effect that inaccuracies in the distance between the stove cover 51 and the gas supply pipe 9 do not cause any difficulties in installation.

The stop plate 21 on which the calibrating marks 23 are arranged is rigidly connected to the setting sleeve 41 by means of a pressed joint. Inside the setting sleeve 41 a plug compression spring 54 is arranged which rests at the left on a shoulder surface of the neck 15 of the plug and bears at the right on a shoulder surface of the setting sleeve 41. In the guide sleeve 6 the setting sleeve 41 is guided by a collar 55. The pressure of the plug spring 54 on the setting sleeve 41 is transferred by means of a projection 56 arranged on it to a directrix 57 arranged inside the guide sleeve 6 and thus to the housing of the entire arrangement. The directrix also serves to lock the setting sleeve and the setting knob 40 in the zero position against accidental displacement. For this purpose, the projection 56 is normally held in a notch 58 of the guiding groove 57 by the action of the plug compression spring 54.

Figure 6 shows an evolution of the directrix or groove 57. In the zero position the projection 56 is in a notch 58 and the displacement of the projection and consequently of the setting sleeve 41 is prevented by the two stopping surfaces 59, 60. Rotation can take place only if the projection 56 is brought into the dotted-line position 61.

In this position the stopping surface 59 is still situated in the path of the projection 56 so that the latter can necessarily be turned to the right only and that at a maximum until it strikes the stopping surface 62. In order to bring the projection 56 into the position 61 it is necessary to exert on the pressure knob 42 an axial pressure to the left. In this manner the pressure knob 42 is protected against unintentional operation. For the purpose of installing the setting sleeve 41 a channel is arranged between the stopping surfaces 59, 60 through which the projection 56 must be passed.

Between the guiding sleeve 6 and the plug housing 5 a protective plate 63 (see Figure 1) is arranged which limits the axial longitudinal movement of the setting sleeve toward the left.

In the plug housing 5 a shunt passage 64 is arranged, the size of which may be adjusted by a needle valve 65 that can be screwed in. This assures a certain gas supply when the valve disc 31 is closed so as to prevent the gas flame from going out.

By means of a gas outlet connection 66 the arrangement described is connected to the fire tubes. To facilitate the connection with the fire tubes the valve chamber 3 and the plug housing 5 are so designed that the former can be connected to the plug housing 5 in four positions each of which is 90° from the other. The gas baking stove temperature regulator can of course be connected to the gas supply pipe 9 also at the bottom. This results in a greatly facilitated installation of the regulator.

The manner of operation of the arrangement described is as follows:

In the initial position shown in Figure 1, plug 7 prevents the entrance of gas from the intake bore 31 and valve disc 31 rests against rest plate 38 so that no gas passage is formed. In all other settings of the setting scale 40 the main valve passages remain open due to the conducting groove 14. The position of the valve disc 31 may be influenced either by the temperature feeler 1 or by the setting knob 40. When influenced from the side of the feeler the manner of operation is as follows:

When the temperature of the feeler 1 increases, the expansion liquid contained in it expands and acts by way of the capillary tube 2 on the metallic bellows 4 with the result that the latter's free membrane moves aside to the right together with the cup 39 and moves the working spindle 26 toward the plug 7. The spindle nut 29 on the setting thread 28 is carried along together with the valve disc 31, whereby the cross section of the valve opening is reduced. When the temperature of the feeler 1 decreases, a contraction of the expansion liquid takes place and counter-spring 35 forces the valve disc 31 and the dish-shaped disc 33 in the opposite direction, this causing the cross section of the opening of the valve to increase again.

The displacement of the valve disc 31 by means of the setting knob 40 when setting the desired value of temperature proceeds as follows:

The projection of the setting sleeve 41, screwed to the setting knob 40 and mounted in the guide sleeve 6, engages the groove 44 of the neck 15 of the plug. Turning the knob 40, turns the calibrating spindle 16, which is fixed to the neck 15 of the plug by means of the lock nut 17, and also turns the working spindle 26 simultaneously. Therefore, the transmission of the turning moment from the setting knob 40 to the plug 7 and valve disc is effected by means of the spring sleeve 41 mounted on the neck 15 of the plug. Thus any external forces acting on the knob are absorbed by the plug itself. By means of the plug spring 54 positioned between the inner surface of the setting sleeve and the shoulder surface of the neck 15 of the plug, the plug is forced with a definite pressure into the plug housing 5.

The spindle nut is held against rotation by the projection 36 of the dish-shaped disc 33, which projection is movable in the groove 37 of the main housing 5, during a displacement of the setting knob 40 and axial motion, moving all the more to the left, the greater the temperature that is set. Thus setting the desired temperature has the purpose of coordinating the position of the valve disc 31 in such a manner that to each value of temperature, i. e. to each position of the metallic bellows 4 there corresponds a definite cross-sectional passage of the disc valve. If the gas supply is to be cut off when the temperature feeler 1 is hot, by turning the setting knob 40 back to the position "off," the closing movement of the valve disc must be so great that the disc valve 31, 36 is securely closed even when the temperature feeler has subsequently cooled, that is to say when the metallic bellows has fully contracted.

It will be understood that in this setting operation the valve disc 31 must be able to move aside in the direction toward the metallic bellows 4, and this is rendered possible by the simultaneous loading of the overload spring which produces the closing pressure of the disc valve and takes care of the complete return movement of the valve disc 31 to its initial position, i. e. until it rests on the stop ring 32 of the spindle nut 29.

Owing to its comparatively small dimensions the embodiment described makes it possible to replace the present gas cock for the baking oven by a temperature regulator on existing types of gas stoves.

The direct contact of the working spindle 26 with the movable part of the mechanical bellows 4 enables one to transfer the movement of the metallic bellows to the valve disc without loss. The support which the overload spring 30 takes on the spindle nut 29 itself, offers the advantage that the two springs 30 and 35 acting on the working spindle 26 do not have any effect on each other. On account of this clear separation of functions there is a better basis for dimensioning said springs.

The invention in its broader aspects is not limited to the specific mechanisms shown and described but departures may be made therefrom within the scope of the accompanying claims without departing from the principles of the invention and without sacrificing its chief advantages.

This case is a continuation of Serial No. 185,918, now abandoned.

What is claimed is:

1. A gas baking oven temperature regulator having a temperature responsive expansible bellows, a spindle directly moved axially by expansion of the bellows, a spindle nut held against rotation and threaded on the spindle for axial movement by rotation of the spindle, a spring urging the spindle and nut towards the bellows, a valve disc and a seat therefor, said valve disc being mounted on the spindle nut for axial movement in one direction relatively to the nut, a spring carried by the nut and normally opposing such motion but permitting movement of the valve disc when it is moved against its seat by expansion of the bellows, and a hollow main rotatable valve coaxial with the spindle and drivingly connected therewith for rotating the spindle as the main valve is rotated.

2. A gas baking oven temperature regulator as claimed in claim 1 in which the nut-carried spring is a multi-arm leaf spring having the ends of its arms pressing against the valve disc.

3. A gas baking oven temperature regulator as claimed in claim 1 in which the nut is held against rotation by means of a disc shaped member forming a seat for the spring urging the spindle, which member has a projection engaging in a groove in the valve body to prevent rotation of the nut.

4. A gas baking oven temperature regulator as claimed in claim 1 in which a second spindle is threaded in the hollow main rotatable valve, is rotatably connected to drive the first spindle and is adjustably held against rotation relatively to the main valve.

5. A gas baking oven temperature regulator as claimed in claim 4 in which the driving connection between the spindles comprises a disc fixed to one spindle having diametrically opposed slots, and a fork carried by the other spindle and engaging in the slots, the disc being supported by the interior of the hollow valve.

6. A gas baking oven temperature regulator as claimed in claim 1 in which the parts are mounted in a three-part casing, one part housing the main valve and having the gas supply connection, another part housing the valve disc and metallic bellows and having a gas outlet, and a third enclosing a stem connected for turning the main valve and by which the regulator is mounted, the three portions being angularly movable so that they may be assembled in different angular positions.

7. A gas baking oven temperature regulator having a temperature responsive bellows, a spindle having an end directly bearing on said bellows and moved axially by expansion or contraction of the bellows, a spindle nut on said spindle and held against rotation, a valve disc mounted on said nut, a seat for said valve disc, said valve disc forming a gas passage when it is moved away from said seat, said valve disc being moved axially by means of the bellows and also by means of a setting knob, said setting knob being connected to a hollow valve in which is located a fixed second spindle, said second spindle being drivingly connected with said first spindle so that when the setting knob is rotated the second spindle rotates with it and drives the first spindle whereby on rotation of said first spindle the valve disc mounted on the spindle nut moves in an axial direction.

8. A gas baking oven temperature regulator as claimed in claim 7 in which the driving connection between the spindles comprises a disc fixed to one spindle having diametrically opposed slots, and a fork carried by the other spindle and engaging in the slots, the disc being supported by the interior of the hollow valve.

9. A gas baking oven temperature regulator as defined in claim 7 in which the second spindle has an indicator fixed at its end adjacent the setting knob.

10. A gas baking oven temperature regulator as defined in claim 7 in which the setting knob is connected to the hollow valve by means of a setting sleeve having projections which extend into grooves located in the hollow valve.

11. A gas baking oven temperature regulator as defined in claim 10 in which said setting sleeve extends into and is coaxial with a guide sleeve, said setting sleeve having lugs projecting into a directrix in said guide sleeve whereby said setting knob is locked against accidental displacement.

12. A gas baking oven regulator as defined in claim 7 in which the parts are mounted in a three part casing, one part housing the valve disc and metallic bellows and having a gas outlet, a central part housing the hollow valve and having a gas supply connection and a third enclosing a setting sleeve on which the setting knob is mounted.

13. A gas baking oven regulator as defined in claim 12 in which the hollow valve has a reduced neck portion on which a spring is mounted between said neck portion and said setting sleeve whereby said hollow valve is positioned in its central housing under pressure.

References Cited in the file of this patent

UNITED STATES PATENTS

| Number | Name | Date |
| --- | --- | --- |
| 1,741,892 | Volkman | Dec. 31, 1929 |
| 2,151,541 | Waddell | Mar. 21, 1939 |
| 2,237,398 | Waddell | Apr. 8, 1941 |
| 2,295,427 | Puster | Sept. 8, 1942 |
| 2,495,398 | Weber | Jan. 24, 1950 |
| 2,509,679 | Evans | May 30, 1950 |

FOREIGN PATENTS

| Number | Country | Date |
| --- | --- | --- |
| 440,111 | Great Britain | Dec. 20, 1935 |